US012734653B2

(12) United States Patent
Su

(10) Patent No.: US 12,734,653 B2
(45) Date of Patent: Sep. 15, 2026

(54) ANTI-SLIP FASTENER DRIVER

(71) Applicant: HONG ANN TOOL INDUSTRIES CO., LTD., Taichung City (TW)

(72) Inventor: Cheng-Wei Su, Taichung City (TW)

(73) Assignee: HONG ANN TOOL INDUSTRIES CO., LTD., Taichung City (TW)

( * ) Notice: Subject to any disclaimer, the term of this patent is extended or adjusted under 35 U.S.C. 154(b) by 355 days.

(21) Appl. No.: 18/538,158

(22) Filed: Dec. 13, 2023

(65) Prior Publication Data

US 2024/0109170 A1 Apr. 4, 2024

Related U.S. Application Data

(63) Continuation-in-part of application No. 17/141,244, filed on Jan. 5, 2021, now abandoned.

(30) Foreign Application Priority Data

Feb. 5, 2020 (TW) ................................ 109103535
Oct. 5, 2020 (TW) ................................ 109134445
Nov. 19, 2020 (TW) ................................ 109140586

(51) Int. Cl.
*B25B 23/10* (2006.01)
*B25B 15/00* (2006.01)
*B25B 15/02* (2006.01)

(52) U.S. Cl.
CPC .......... *B25B 23/105* (2013.01); *B25B 15/004* (2013.01); *B25B 15/02* (2013.01)

(58) Field of Classification Search
CPC ..... B25B 23/10; B25B 23/105; B25B 23/108; B25B 15/00; B25B 15/02; B25B 15/004; B25B 15/005; B25B 15/008; B25B 21/00; B25B 27/18; F16B 23/00; F16B 23/0023; F16B 23/0076; F16B 23/0061; F16B 23/0007; F16B 41/005; B21K 1/463
See application file for complete search history.

(56) References Cited

U.S. PATENT DOCUMENTS 4,270,418 A * 6/1981 Shephard .............. B25B 15/004
81/441
6,761,089 B2 7/2004 Bergamo
(Continued)

FOREIGN PATENT DOCUMENTS

CN 203831351 U 9/2014
CN 104209916 A 12/2014
(Continued)

*Primary Examiner* — Robert J Scruggs
(74) *Attorney, Agent, or Firm* — MUNCY, GEISSLER, OLDS & LOWE, P.C.

(57) ABSTRACT

An anti-slip fastener driver includes a shank and a driving portion formed on an end of the shank and defining a longitudinal axis. The driving portion includes an outer periphery surrounding the longitudinal axis and having a first peripheral face. An end of the driving portion opposite to the shank includes a first bevel face connected to the first peripheral face. The first bevel face includes a first side and a first corner opposite to the first side. The end of the driving portion opposite to the shank defines a reference plane perpendicular to the longitudinal axis. The first side is located on the reference plane. The first corner is located between the reference plane and the shank.

8 Claims, 8 Drawing Sheets

(56) References Cited

U.S. PATENT DOCUMENTS

| | | | | |
|---|---|---|---|---|
| 6,978,697 | B2 | 12/2005 | Kozak | |
| 7,171,871 | B2 | 2/2007 | Kozak | |
| 8,215,206 | B2 | 7/2012 | Kozak et al. | |
| 8,276,482 | B2 | 10/2012 | Kozak et al. | |
| 8,485,066 | B2 | 7/2013 | Kozak et al. | |
| 8,739,658 | B2 | 6/2014 | Kozak et al. | |
| 8,984,991 | B1 * | 3/2015 | English | B25B 13/06 81/53.2 |
| 9,539,711 | B2 | 1/2017 | Chen | |
| 9,687,968 | B2 | 6/2017 | Doroslovac et al. | |
| 10,081,094 | B2 | 9/2018 | Doroslovac et al. | |
| 10,780,556 | B2 | 9/2020 | Kukucka et al. | |
| 10,786,890 | B2 | 9/2020 | Kukucka et al. | |
| 10,814,461 | B2 | 10/2020 | Doroslovac et al. | |
| 10,882,162 | B2 | 1/2021 | Kukucka et al. | |
| 10,919,133 | B2 | 2/2021 | Kukucka et al. | |
| 10,953,522 | B2 | 3/2021 | Dilling | |
| 10,967,488 | B2 | 4/2021 | Kukucka et al. | |
| 11,045,925 | B2 | 6/2021 | Kukucka et al. | |
| 11,103,983 | B2 | 8/2021 | Kukucka et al. | |
| 11,154,969 | B2 | 10/2021 | Kukucka et al. | |
| 11,364,602 | B2 | 6/2022 | Kukucka et al. | |
| 11,396,089 | B2 | 7/2022 | Kukucka et al. | |
| 11,511,409 | B2 | 11/2022 | Kukucka et al. | |
| 2006/0101949 | A1 | 5/2006 | Kozak et al. | |
| 2014/0102264 | A1 * | 4/2014 | Werner | F16B 23/0007 81/436 |
| 2015/0314429 | A1 * | 11/2015 | Doroslovac | B25B 13/065 81/441 |
| 2017/0252905 | A1 | 9/2017 | Doroslovac et al. | |
| 2017/0282337 | A1 * | 10/2017 | Johnson | B25B 15/008 |
| 2018/0354102 | A1 | 12/2018 | Kukucka et al. | |
| 2019/0152033 | A1 | 5/2019 | Kukucka et al. | |
| 2019/0337131 | A1 | 11/2019 | Kukucka et al. | |
| 2021/0146506 | A1 | 5/2021 | Kukucka et al. | |
| 2021/0205965 | A1 | 7/2021 | Dilling | |
| 2021/0220977 | A1 | 7/2021 | Kukucka et al. | |
| 2021/0283756 | A1 | 9/2021 | Kukucka et al. | |
| 2021/0387312 | A1 | 12/2021 | Kukucka et al. | |
| 2022/0040830 | A1 | 2/2022 | Kukucka et al. | |
| 2022/0040834 | A1 | 2/2022 | Kukucka et al. | |
| 2022/0161398 | A1 | 5/2022 | Dilling | |
| 2022/0168877 | A1 | 6/2022 | Kukucka et al. | |
| 2022/0281085 | A1 | 9/2022 | Kukucka et al. | |
| 2022/0362910 | A1 | 11/2022 | Kukucka et al. | |

FOREIGN PATENT DOCUMENTS

| | | | |
|---|---|---|---|
| CN | 207824800 | U | 9/2018 |
| FR | 2585609 | A1 | 2/1987 |
| TW | I704982 | B | 9/2020 |

* cited by examiner

ANTI-SLIP FASTENER DRIVER

CROSS-REFERENCE

The present application is a continuation-in-part application of U.S. patent application Ser. No. 17/141,244, filed on Jan. 5, 2021, now pending, which claims priority of Taiwan patent application Ser. No. 109140586, filed on Nov. 19, 2020, of which the entire disclosure is incorporated herein by reference for all purposes.

BACKGROUND OF THE INVENTION

The present invention relates to anti-slip fastener drivers.

A conventional fastener driver, such as a hexagonal wrench, a screwdriver, etc. is a hand tool that is usually used to driver a fastener, such as a bolt or a screw. Considering the costs and the fact that the fasteners are common expendables, the fasteners are generally made of materials softer than the fastener drivers, resulting in wear of the fasteners while being driven by the fastener drivers. Furthermore, a fastener forcibly driven by a fastener driver of a size not matching with the fastener will wear, too. The wear of a fastener result in damage to a driving hole of the fastener. In a case that the driving hole of the fastener becomes a nearly circular hole, when the fastener driver engages with the driving hole and rotates to drive the fastener, the fastener driver slips relative to the fastener, failing to effectively drive the fastener.

In view of the above drawbacks of the conventional structure, Applicant has designed an anti-slip fastener driver that mitigates and/or obviates the above disadvantages.

SUMMARY OF THE INVENTION

An objective of the present invention is to provide an anti-slip fastener driver, which includes a shank and a driving portion formed on an end of the shank. The driving portion defines a longitudinal axis extending therethrough. The driving portion has a top end flat face extending perpendicularly to the longitudinal axis, a plurality of outer peripheral faces surrounding the longitudinal axis, and a plurality of driving recesses formed on the top end flat face and sequentially arranged around the longitudinal axis. Each of the plurality of driving recesses has a bevel face inclinedly connected to the top end flat face at an inclination angle, and a driving face perpendicularly connected to the top end flat face.

In an example, the number of the plurality of outer peripheral faces is six to cause the driving portion having a regular hexagonal cross-sectional shape, and the number of the plurality of driving recesses is six.

In an example, each of the plurality of outer peripheral faces is a right trapezoid surface having a top short side adjacently connected to the top end flat face, a bottom long side parallel to the top short side and connected to the shank, and a first lateral side and a second lateral side parallel to each other and respectively connected to adjacent outer peripheral faces.

In an example, a length of the top short side is less than a half of a length of bottom long side.

In an example, the inclination angle is in a range of 130 degrees to 175 degrees.

In an example, each of the plurality of driving recesses further has a first driving edge adjacently connected to the top end flat face and the respective bevel face, and a second driving edge adjacently connected to the top end flat face and the respective driving face.

In an example, an included angle is formed between the first driving edge and the second driving edge, and the included angle is greater than 50 degrees.

In another example, an included angle is formed between the first driving edge and the second driving edge, and the included angle is greater than 80 degrees.

DETAILED DESCRIPTION OF THE INVENTION

Figure 1:
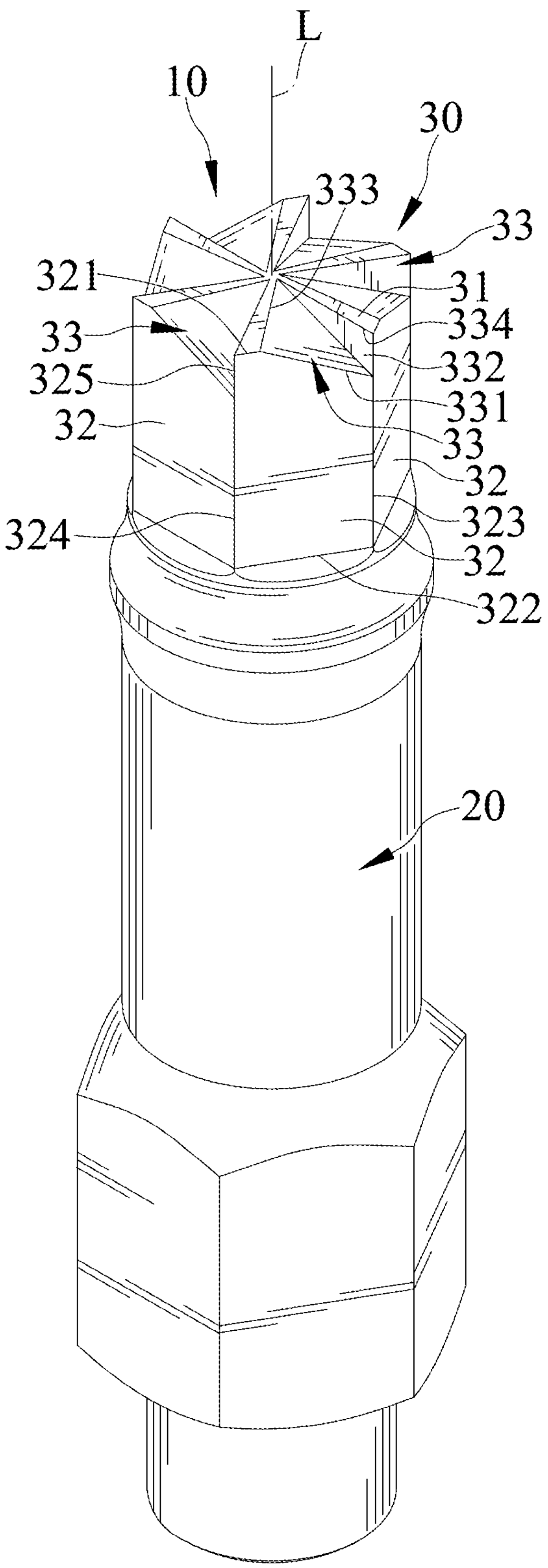
FIG. 1 is a perspective view of an anti-slip fastener driver of a first embodiment according to the present invention.
Figure 2:
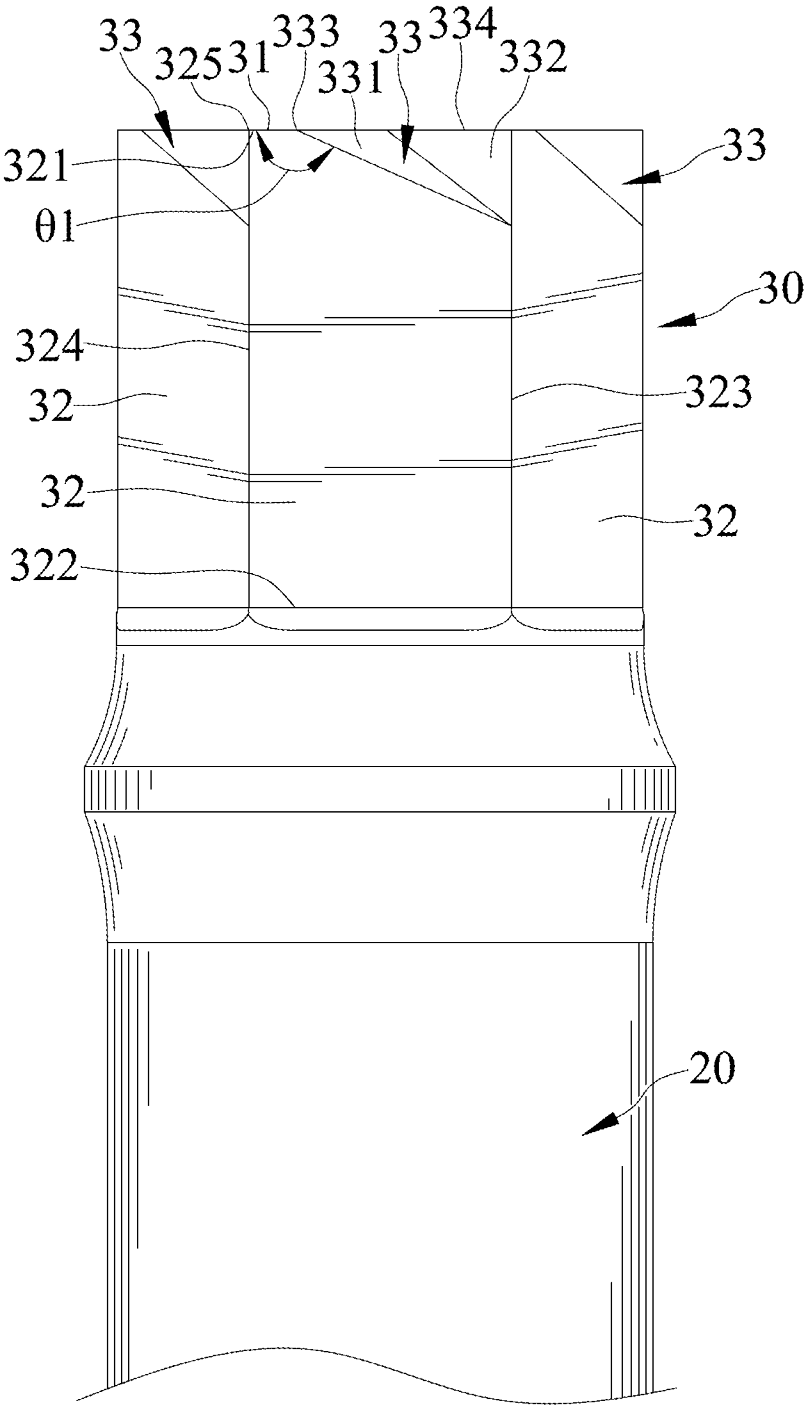
FIG. 2 is a partial, side elevational view of the anti-slip fastener driver of FIG. 1.
Figure 3:
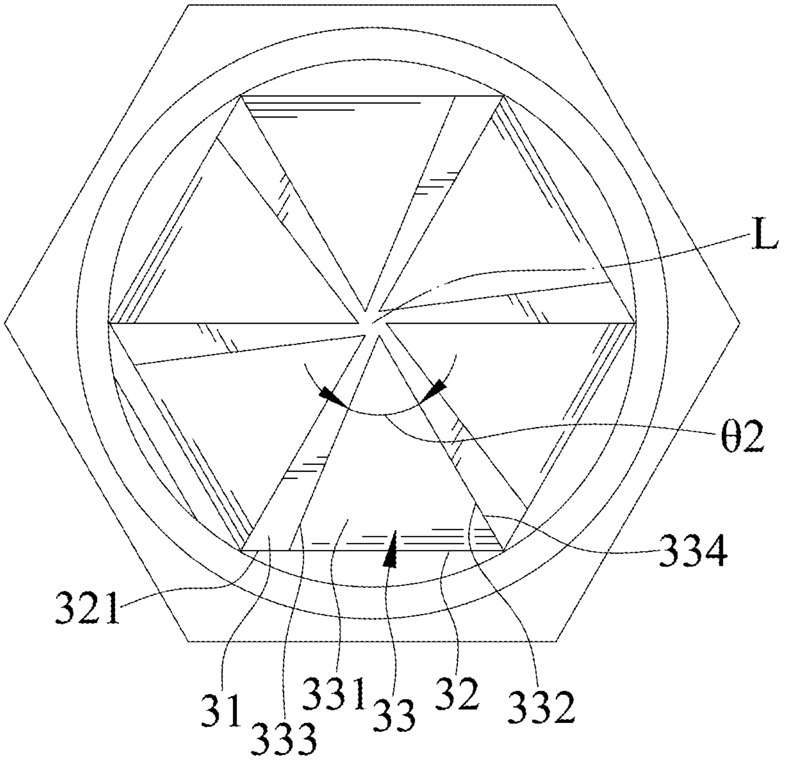
FIG. 3 is an end elevational view of the anti-slip fastener driver of FIG. 1.
Figure 4:
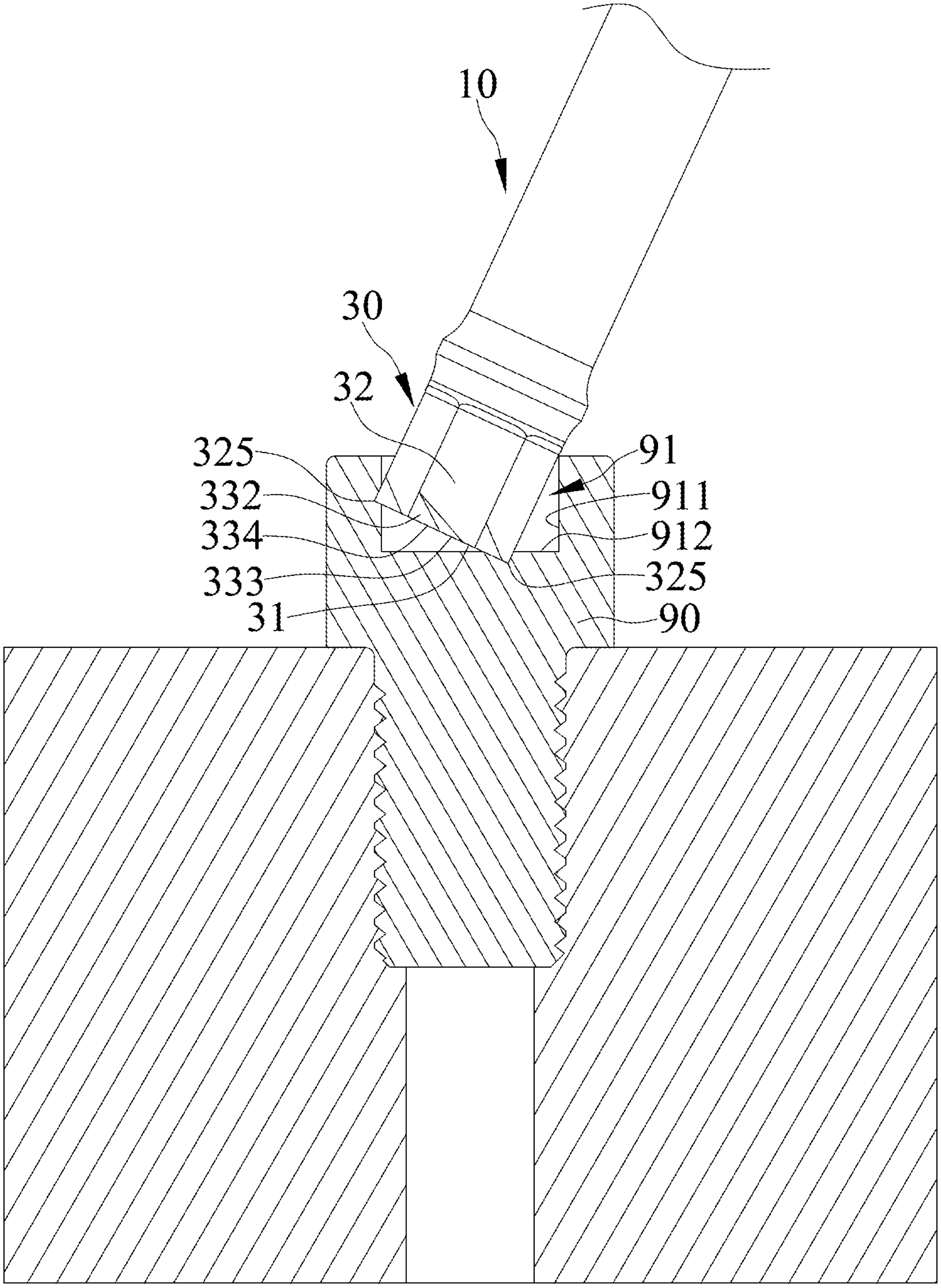
FIGS. 4 and 5 are illustration views for illustrating the anti-slip fastener driver driving a damaged screw.
Figure 5:
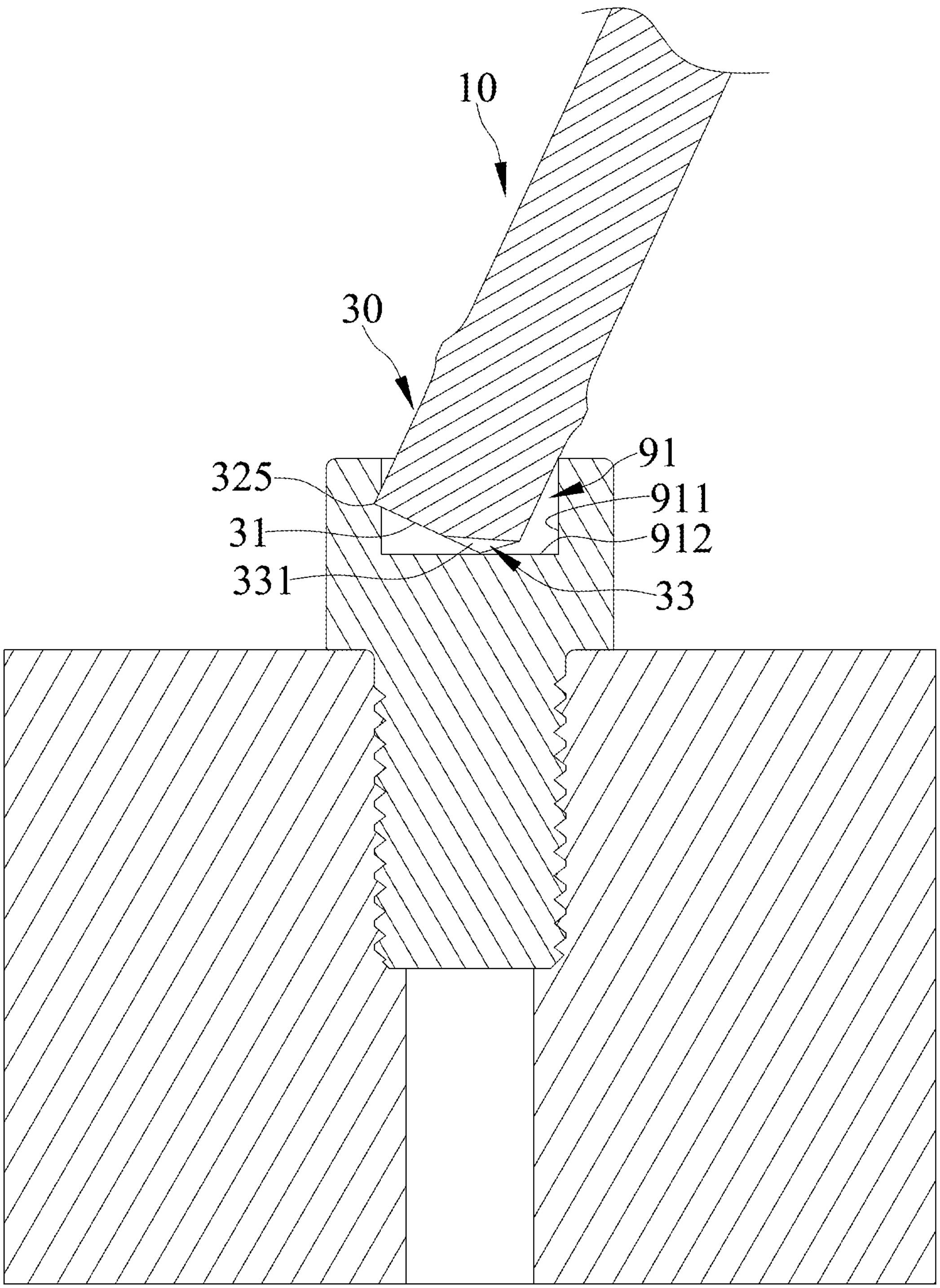

FIGS. 1-5 show an anti-slip fastener driver 10 of a first embodiment according to the present invention. The anti-slip fastener driver 10 includes a shank 20 and a driving portion 30 formed on an end of the shank 20. The driving portion 30 defines a longitudinal axis L extending therethrough, allowing the driving portion 30 being rotatable about the longitudinal axis L. The driving portion 30 has a top end flat face 31 extending perpendicularly to the longitudinal axis L, a plurality of outer peripheral faces 32 arranged continuous and surrounding the longitudinal axis L, and a plurality of driving recesses 33 formed on the top end flat face 31 and sequentially arranged around the longitudinal axis L. Each of the plurality of driving recesses 33 has a bevel face 331 inclinedly connected to the top end flat face 31 at an inclination angle θ1, and a driving face 332 perpendicularly connected to the top end flat face 31.

Further, the number of the plurality of outer peripheral faces 32 is six to cause the driving portion 30 having a regular hexagonal cross-sectional shape, and the number of the plurality of driving recesses 33 is six. Thus, the top end flat face 31 in the embodiment is formed as an outwardly extending fan-shaped surface from the longitudinal axis L.

Each of the plurality of outer peripheral faces 32 is a right trapezoid surface, which has a top short side 321 adjacently connected to the top end flat face 31, a bottom long side 322 parallel to the top short side 321 and connected to the shank 20, and a first lateral side 323 and a second lateral side 324 parallel to each other and respectively connected to adjacent outer peripheral faces 32. The first lateral side 323 is lees than the second lateral side 324.

The length of the top short side 321 may be less than a half of the length of bottom long side 322. In the embodiment, the length of the top short side 321 is less than one third of the length of bottom long side 322.

Furthermore, the inclination angle θ1 of the embodiment is in a range of 130 degrees to 175 degrees, preferably in the range of 150 degrees to 160 degrees.

Each of the plurality of driving recesses 33 further has a first driving edge 333 adjacently connected to the top end flat face 31 and the respective bevel face 331, and a second driving edge 334 adjacently connected to the top end flat face 31 and the respective driving face 332.

In the embodiment, an included angle θ2 is formed between the first driving edge 333 and the second driving edge 334, and the included angle θ2 is greater than 50 degrees.

In use of the anti-slip fastener driver 10, the driving portion 30 can be inserted into the a driving hole 91 of a damaged screw 90 in a slant direction, allowing the top end flat face 31, a corner 325 formed between the top short side 321 and the second lateral side 324, and the first and second driving edges 333 and 334 to engageably contact with an inner wall face 911 and a inner bottom face 912 of the driving hole 91, assisting in driving of the screw 90.

Thus, the anti-slip fastener driver 10 can achieve an excellent anti-slip effect by the above structure and, thus, can smoothly drive the screw 90 even if the driving hole 91 of the screw 90 is damaged.

Figure 6:
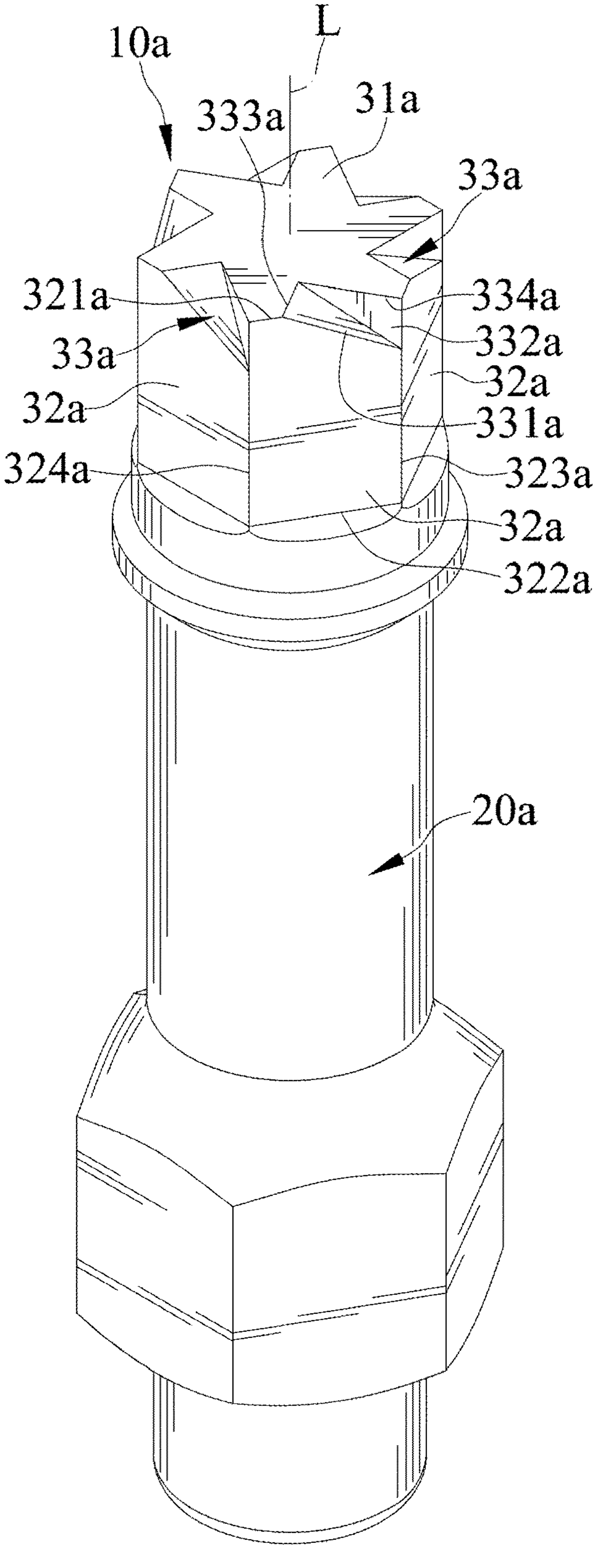
FIG. 6 is a perspective view of an anti-slip fastener driver of a second embodiment according to the present invention.
Figure 7:
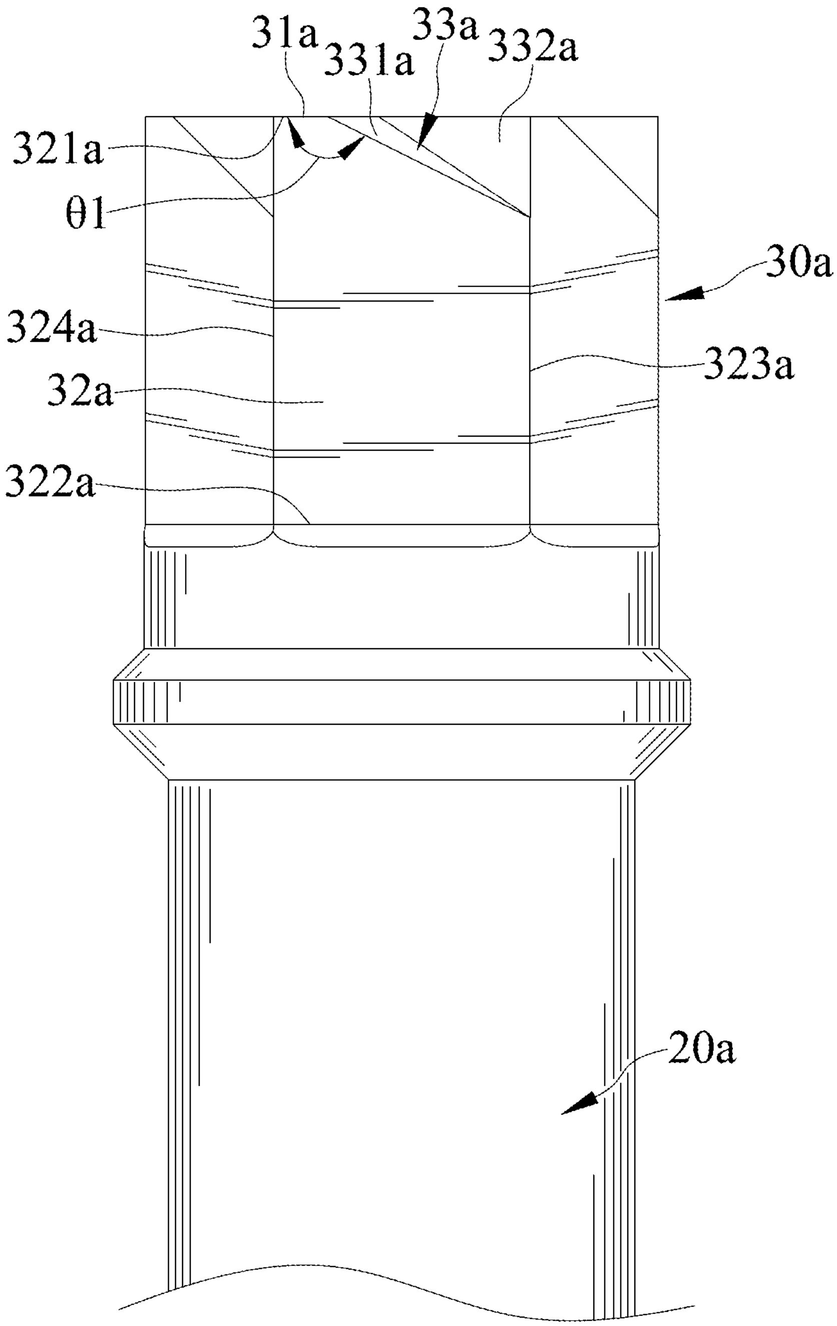
FIG. 7 is a partial, side elevational view of the anti-slip fastener driver of FIG. 6.
Figure 8:
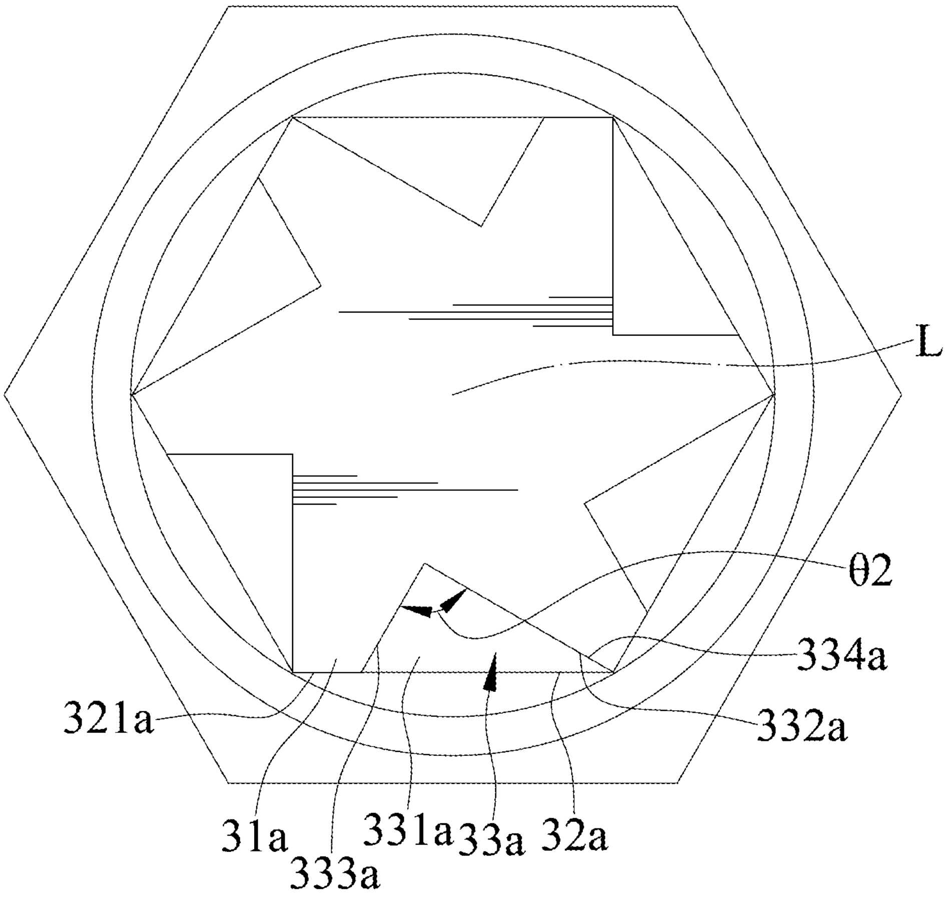
FIG. 8 is an end elevational view of the anti-slip fastener driver of FIG. 6.

FIGS. 6-8 show an anti-slip fastener driver 10*a* of a second embodiment according to the present invention. The an anti-slip fastener driver 10*a* includes a shank 20*a* and a driving portion 30*a* formed on an end of the shank 20*a*. The driving portion 30*a* defines a longitudinal axis L extending therethrough, allowing the driving portion 30*a* being rotatable about the longitudinal axis L. The driving portion 30*a* has a top end flat face 31*a* extending perpendicularly to the longitudinal axis L, a plurality of outer peripheral faces 32*a* arranged continuous and surrounding the longitudinal axis L, and a plurality of driving recesses 33*a* formed on the top end flat face 31*a* and sequentially arranged around the longitudinal axis L. Each of the plurality of driving recesses 33*a* has a bevel face 331*a* inclinedly connected to the top end flat face 31*a* at an inclination angle θ1, and a driving face 332*a* perpendicularly connected to the top end flat face 31*a*.

Further, the number of the plurality of outer peripheral faces 32*a* is six to cause the driving portion 30*a* having a regular hexagonal cross-sectional shape, and the number of the plurality of driving recesses 33*a* is six. Thus, the top end flat face 31*a* in the embodiment is formed as an outwardly extending fan-shaped surface from the longitudinal axis L.

Each of the plurality of outer peripheral faces 32*a* is a right trapezoid surface, which has a top short side 321*a* adjacently connected to the top end flat face 31*a*, a bottom long side 322*a* parallel to the top short side 321*a* and connected to the shank 20*a*, and a first lateral side 323*a* and a second lateral side 324*a* parallel to each other and respectively connected to adjacent outer peripheral faces 32*a*. The first lateral side 323*a* is lees than the second lateral side 324*a*.

The length of the top short side 321*a* may be less than a half of the length of bottom long side 322*a*. In the embodiment, the length of the top short side 321*a* is less than one third of the length of bottom long side 322*a*.

Furthermore, the inclination angle θ1 of the embodiment is in a range of 130 degrees to 175 degrees, preferably in the range of 150 degrees to 160 degrees.

Each of the plurality of driving recesses 33*a* further has a first driving edge 333*a* adjacently connected to the top end flat face 31*a* and the respective bevel face 331*a*, and a second driving edge 334*a* adjacently connected to the top end flat face 31*a* and the respective driving face 332*a*.

In the embodiment, an included angle θ2 is formed between the first driving edge 333*a* and the second driving edge 334*a*, and the included angle θ2 is greater than 80 degrees.

Although specific embodiments have been illustrated and described, numerous modifications and variations are still possible without departing from the scope of the invention. The scope of the invention is limited by the accompanying claims.

The invention claimed is:

1. An anti-slip fastener driver comprising:

a shank; and a driving portion formed on an end of the shank and defining a longitudinal axis extending therethrough, wherein the driving portion has a top end flat face extending perpendicularly to the longitudinal axis, a plurality of outer peripheral faces surrounding the longitudinal axis, and a plurality of driving recesses formed on the top end flat face and sequentially arranged around the longitudinal axis, wherein each of the plurality of outer peripheral faces includes a top short side adjacent to the top end flat face, and a first lateral side, wherein each of the plurality of driving recesses has a bevel face inclinedly connected to the top end flat face at an inclination angle, and a driving face perpendicularly connected to the top end flat face, wherein the driving portion is configured to be inserted into a driving hole of a damaged screw in a direction deviating from the longitudinal axis, such that the top end flat face, a corner formed between the top short side and the first lateral side of one of the outer peripheral faces, and portions defining the driving recesses engageably contact an inner wall face and an inner bottom face of the driving hole to assist in driving of the damaged screw and prevent slipping.

2. The anti-slip fastener driver as claimed in claim 1, wherein the number of the plurality of outer peripheral faces is six to cause the driving portion having a regular hexagonal cross-sectional shape, and wherein the number of the plurality of driving recesses is six.

3. The anti-slip fastener driver as claimed in claim 2, wherein each of the plurality of outer peripheral faces is a right trapezoid surface having the top short side adjacently connected to the top end flat face, a bottom long side parallel to the top short side and connected to the shank, and the first lateral side and a second lateral side parallel to each other and respectively connected to adjacent outer peripheral faces.

4. The anti-slip fastener driver as claimed in claim 3, wherein a length of the top short side is less than a half of a length of bottom long side.

5. The anti-slip fastener driver as claimed in claim 1, wherein the inclination angle is in a range of 130 degrees to 175 degrees.

6. The anti-slip fastener driver as claimed in claim 1, wherein each of the plurality of driving recesses further has a first driving edge adjacently connected to the top end flat face and the respective bevel face, and a second driving edge adjacently connected to the top end flat face and the respective driving face.

7. The anti-slip fastener driver as claimed in claim 6, wherein an included angle is formed between the first driving edge and the second driving edge, and wherein the included angle is greater than 50 degrees.

8. The anti-slip fastener driver as claimed in claim 6, wherein an included angle is formed between the first driving edge and the second driving edge, and wherein the included angle is greater than 80 degrees.

* * * * *